US 8,528,689 B2

(12) United States Patent
Uryu

(10) Patent No.: US 8,528,689 B2
(45) Date of Patent: Sep. 10, 2013

(54) MOTOR DRIVE APPARATUS AND METHOD, AND ELECTRIC POWER STEERING SYSTEM USING THE SAME

(75) Inventor: Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 191 days.

(21) Appl. No.: 13/134,986

(22) Filed: Jun. 22, 2011

(65) Prior Publication Data

US 2011/0315470 A1 Dec. 29, 2011

(30) Foreign Application Priority Data

Jun. 24, 2010 (JP) ................................. 2010-143687
Dec. 14, 2010 (JP) ................................. 2010-277965

(51) Int. Cl.
*B62D 5/04* (2006.01)
*H02P 6/12* (2006.01)

(52) U.S. Cl.
USPC ............................... 180/446; 701/41; 701/42

(58) Field of Classification Search
USPC .................. 180/443, 444, 446; 701/41, 43; 318/490, 491; 363/41, 55, 71; 361/23
See application file for complete search history.

(56) References Cited

U.S. PATENT DOCUMENTS

| 5,828,972 A | * | 10/1998 | Asanuma et al. | 701/41 |
| 5,969,919 A | * | 10/1999 | Kobayashi et al. | 361/23 |
| 6,031,298 A | * | 2/2000 | Lo et al. | 307/64 |
| 6,041,884 A | | 3/2000 | Shimizu et al. | |
| 6,158,553 A | * | 12/2000 | Oshima et al. | 187/293 |
| 7,091,684 B2 | | 8/2006 | Kobayashi et al. | |
| 7,439,697 B2 | * | 10/2008 | Miyazaki et al. | 318/400.41 |
| 7,806,225 B2 | | 10/2010 | Itoh | |
| 7,813,089 B2 | | 10/2010 | Suzuki | |
| 7,837,004 B2 | | 11/2010 | Yasuda | |
| 8,027,766 B2 | | 9/2011 | Nozawa et al. | |
| 8,116,945 B2 | | 2/2012 | Nozawa | |
| 8,436,568 B2 | * | 5/2013 | Mukai et al. | 318/490 |
| 2003/0155172 A1 | * | 8/2003 | Kawada et al. | 180/446 |
| 2005/0241875 A1 | | 11/2005 | Ta et al. | |
| 2009/0230901 A1 | | 9/2009 | Amano | |
| 2009/0242293 A1 | | 10/2009 | Tanaka et al. | |
| 2011/0043152 A1 | | 2/2011 | Kidokoro et al. | |

FOREIGN PATENT DOCUMENTS

| JP | 06-344937 | 12/1994 |
| JP | 2003-26020 | 1/2003 |
| JP | 2005-304119 | 10/2005 |
| JP | 2008-99394 | 4/2008 |

OTHER PUBLICATIONS

U.S. Appl. No. 13/134,971, filed Jun. 22, 2011, Uryu.
U.S. Appl. No. 13/134,972, filed Jun. 22, 2011, Uryu.

(Continued)

*Primary Examiner* — Anne Marie M Boehler
(74) *Attorney, Agent, or Firm* — Harness, Dickey & Pierce, PLC

(57) ABSTRACT

When an inverter or a coil set of one system fails in a motor drive apparatus having two power supply systems, a power supply relay of a failing system is turned off. In this case, while a travel speed detection value is less than a predetermined threshold value, current supply to a motor by the other system operating normally is stopped to thereby stop driving of the motor and generate no steering assist torque. Thus, a driver will be caused to surely notice occurrence of failure.

4 Claims, 5 Drawing Sheets

(56) References Cited

OTHER PUBLICATIONS

Office Action issued Jan. 8, 2013 in corresponding Japanese Application No. 2010-277964 with English translation.
Office Action issued Jan. 8, 2013 in corresponding Japanese Application No. 2010-277965 with English translation.
Office Action issued Dec. 10, 2012 in related U.S. Appl. No. 13/134,971.
Office action dated Feb. 15, 2013 in co-pending U.S. Appl. No. 13/134,971.
U.S. Appl. No. 12/977,449, filed Dec. 23, 2010, Satou et al.
U.S. Appl. No. 12/977,489, filed Dec. 23, 2010, Nakamura et al.

* cited by examiner

MOTOR DRIVE APPARATUS AND METHOD, AND ELECTRIC POWER STEERING SYSTEM USING THE SAME

CROSS REFERENCE TO RELATED APPLICATION

This application is based on and incorporates herein by reference Japanese patent applications No. 2010-143687 filed on Jun. 24, 2010 and No. 2010-277965 filed on Dec. 14, 2010.

FIELD OF THE INVENTION

The present invention relates to a motor drive apparatus and method, which drives an electric motor by a plurality of inverters and a plurality of coil sets, and an electric power steering system using the same.

BACKGROUND OF THE INVENTION

A motor drive apparatus disclosed in the following patent document 1 has a plurality of inverters. In this motor drive apparatus, when one of the plurality of inverters fails, electric power is stopped from being supplied from a failing inverter to a plurality of coil sets and electric power is supplied to the coil sets from normal inverters other than the failing inverter. Thus, even when one of the inverters fails, the motor can be continuously operated by driving the motor by only the normal inverters.

[Patent document 1] JP 2005-304119A

In a motor drive apparatus, a combination of one inverter and one coil set, which is paired to such an inverter, forms one power supply system. According to a prior art technology disclosed in patent document 1, when power supply to a failing system is stopped in case of detection of failure, output of the failing system falls at the same time as the occurrence of failure. As a result, motor operation rapidly changes immediately after the failure. In case that the motor drive apparatus is used, for example, as an electric power steering system for a vehicle, the rapid change in motor output will cause vehicle operation change, which a driver do not intend. It is possible to continuously compensate for the loss in motor output by the normal systems other than the failing system. The inverters in the normal systems will be loaded excessively and overheats. Although it is also possible to increase power capacity of inverters to protect the inverters from being overloaded, the inverters become large-sized and expensive.

The applicant of the present application proposed technologies, which counter the foregoing problem by two patent applications. One is a U.S. patent application Ser. No. 12/977,449 (JP application No. 2009-295533). This technology provides a motor drive apparatus, which suppresses operation changes caused by stopping an operation of a failing system upon occurrence of a failure in one of power supply systems. This is a solution to solve the problem that a rapid operation change occurs immediately after failure.

In case this technology is used in an electric power steering system of a vehicle, the operation change is suppressed by controlling inverters operating normally to compensate for loss of power, which has been supplied by a failing system, temporarily at the time of occurrence of failure. Since a driver will not sense any change in steering operation in such a case, the driver will not notice the failure.

Under a condition that one of two power supply systems of motor drive apparatus is in failure, the driver notices the failure and generally takes the vehicle to a repair shop at the earliest time. This technology intends to continue to drive the motor by one normal system so that the driver will be able to drive the vehicle to the repair shop with the same steering feeling as before the occurrence of failure. If the driver continues to use the vehicle without noticing the failure, the normal system will also fail sooner or later and steering torque will not be power-assisted at all in the end.

The second one is a U.S. patent application Ser. No. 12/977,489 (JP application No. 2009-295534). This technology provides an electric power steering system, which equalizes a maximum current command value commanded to an inverter (power converter) of a normal system after occurrence of failure to a maximum current supply value having been supplied to coils by the inverter of the normal system before occurrence of failure. This is a solution to solve the problem that the inverter of the normal system will be overloaded and overheat if it is controlled to maintain even after the occurrence of failure the same total output as before the occurrence of failure.

For example, in case that one of two systems fails, the maximum current command value is reduced to one-half from that of two systems. Thus, the inverter of the normal system is protected from being overloaded. Further, a change in the feeling of steering operation is provided to the driver by reducing the steering torque output to one-half. It is also proposed as an auxiliary measure to call driver's attention by a warning light or a buzzer at the time of failure.

The output required in the electric power steering system is reduced, however, to about one-third of output required when the vehicle is at rest, when travel speed of the vehicle becomes higher than 4 km/hr. For this reason, even if the steering assist torque output is reduced to one-half during travel of the vehicle, the driver will not sense change in steering operation feeling until a steering wheel is turned a large angle. The driver will thus not notice the occurrence of failure.

The following problem will also arise when the vehicle starts to travel from the travel stop condition in a parking lot or at a traffic light, if the steering assist torque is reduced to one-half. It is because high power output is required most at the time of starting to travel.

First, the steering assist torque provided is insufficient. The motor for the electric power steering system is generally designed to have specifications, which meet a maximum torque requirement. That is, in case that the motor drive apparatus has two power supply systems, the motor is designed to generate the maximum required torque by two power supply systems. Therefore, the output by only one power supply system cannot provide sufficient steering torque.

Since sufficient steering assist torque cannot be provided, a driver is required to perform heavy steering operation and hence need long time to steer a vehicle. The time, in which a current continues to flow to drive the motor, becomes long. For this reason, even if the output is reduced to one-half relative to that of normal time, the amount of electric power increases to be more than twice when the current supply time becomes more than twice. The inverter in the normal system will tend to overheat. It is thus impossible to reduce abnormal heat generation of the inverter operating normally.

In case that the motor drive apparatus has an overheat protection control function, which detects temperature of the inverter or the like and limits a current command value when the detected temperature rises above a predetermined assured temperature value, the inverter of the normal system overheats by steering operation of the driver by force at the travel stop time of the vehicle. The current command value is limited by the overheat protection control function. As a result, the steering assist torque is reduced to be less than one-half of that of the normal time even after the vehicle started traveling. It is thus not possible that a driver can drive a vehicle with the same steering feeling as before the occurrence of failure with the steering assist torque, which is generated by continuing to drive the motor with one-half of power of the normal time while preventing excessive heating of the inverter of the normal system.

SUMMARY OF THE INVENTION

It is an object of the present invention to provide a motor drive apparatus, which not only causes a driver to surely notice occurrence of failure when any one of inverters or coil sets fails, but also protect overheat of an inverter.

According to one aspect of the present invention, a motor drive apparatus and a motor drive method are provided. The motor includes a plurality of coil sets for an electric power steering system of a vehicle. The motor drive apparatus includes a plurality of inverters for converting DC power of a DC power source to AC power for the motor. The inverters are paired with the coil sets of the motor. The motor control apparatus detects failure in any one of the inverters or the coil sets and interrupts power supply to the inverter that corresponds to the inverter or the coil set, which is detected as having failure. The motor control apparatus checks whether a travel speed of the vehicle is greater or less than a predetermined threshold value. The motor control apparatus drives the motor by only the inverter operating normally, when the travel speed of the vehicle is determined to be greater than the predetermined threshold value. The motor drive apparatus stops the motor by reducing power supply to the inverter operating normally to about zero, when the travel speed of the vehicle is determined to be less than the predetermined threshold value.

BRIEF DESCRIPTION OF THE DRAWINGS

The foregoing and other objects, features and advantages of the present invention will become more apparent from the following detailed description made with reference to the accompanying drawings. In the drawings.

DETAILED DESCRIPTION OF THE PREFERRED EMBODIMENT

Embodiments of the present invention, which are used in an electric power steering system for assisting steering operation of a vehicle, will be described below with reference to the drawings.

First Embodiment

Figure 1:
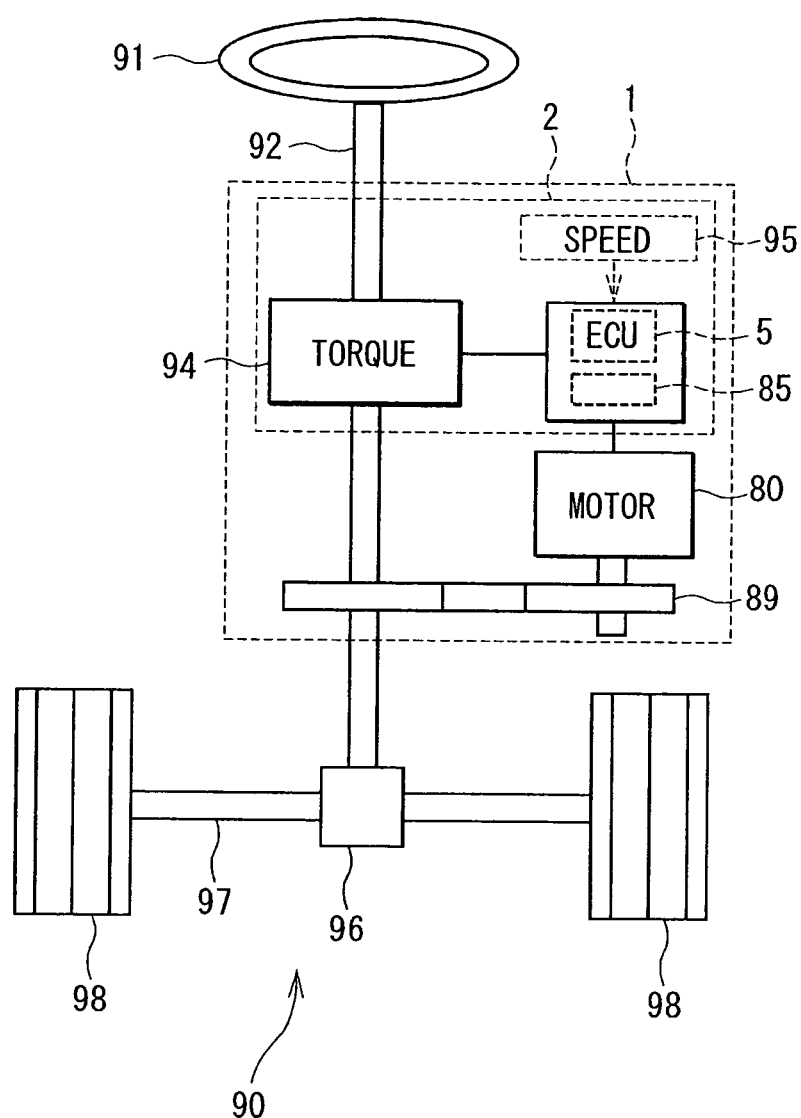
FIG. 1 is a schematic diagram of an electric power steering apparatus, which uses a motor drive apparatus according to a first embodiment of the present invention.

Referring first to FIG. 1, an electric power steering system 1 provided in a steering system has a torque sensor 94, which detects steering torque, on a steering shaft 92 coupled to a steering wheel 91. A pinion gear 96 is attached to an end of the steering shaft 92. The pinion gear 96 is meshed with a rack shaft 97. A pair of tire wheels 98 is coupled to both ends of the rack shaft 97 rotatably through tie rods and the like.

When a driver turns the steering wheel 91, the steering shaft 92 coupled to the steering wheel 91 rotates. Rotary motion of the steering shaft 92 is converted into linear motion of the rack shaft 97 by the pinion gear 96. The pair of wheels 98 is steered by an angle corresponding to an amount of the linear motion of the rack shaft 97.

The electric power steering system 1 is provided with an electric motor 80 for generating steering assist torque, a reduction gear 89 for reducing and transferring rotation of the motor 80 to the steering shaft 92, and a motor drive apparatus 2. The motor 80 is a three-phase brushless motor and rotates the reduction gear 89 in forward and reverse directions. The reduction gear 89 is a motive power transfer device. The motor drive apparatus 2 includes an electronic control unit (ECU) 5, which includes, in addition to the torque sensor 94, a rotation angle sensor 85 for detecting a rotation angle of the motor 80 and other sensors. According to this construction, the electric power steering system 1 generates steering assist torque for assisting steering operation of the steering wheel 91 and transfers it to the steering shaft 92.

Figure 2:
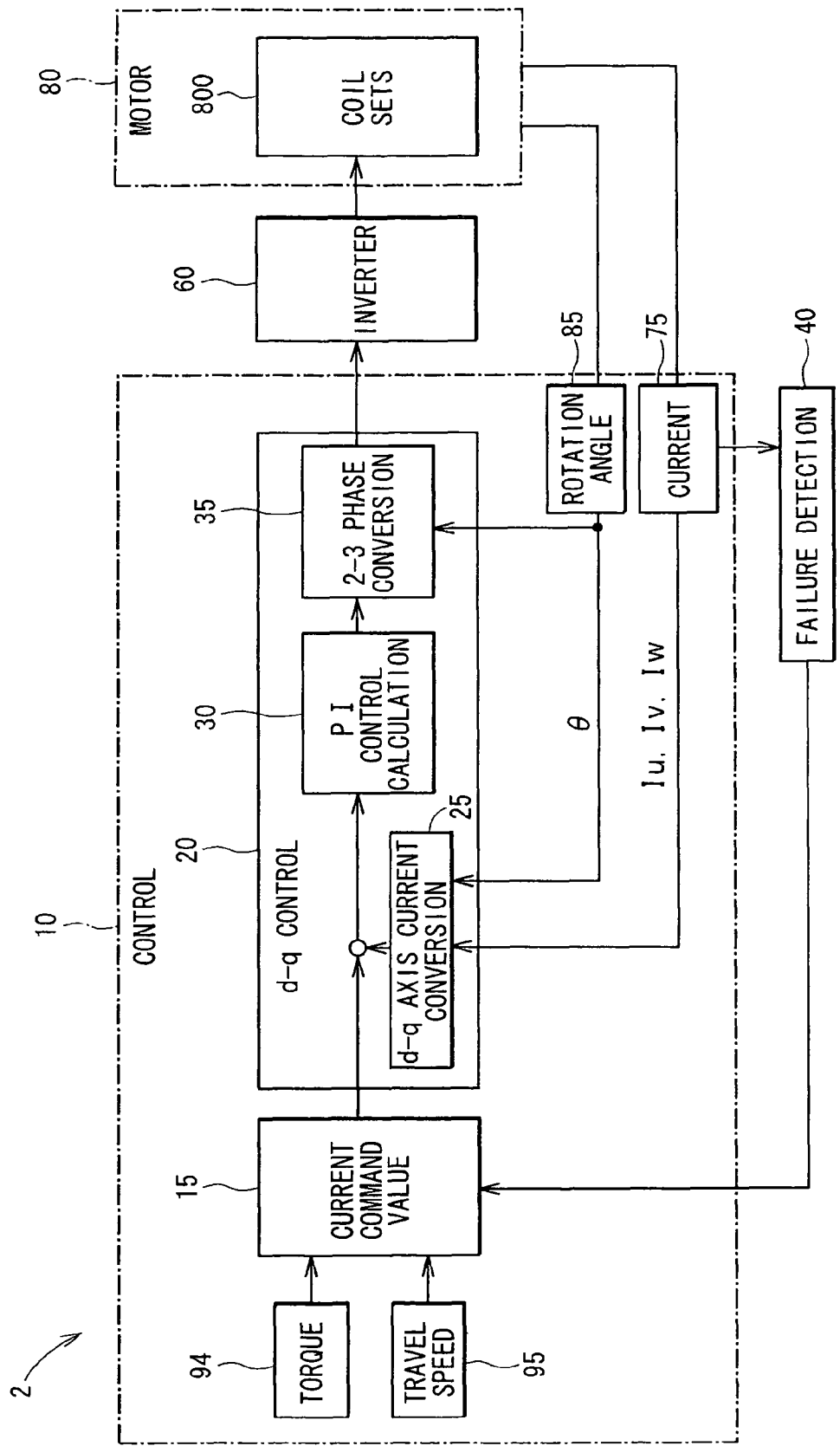
FIG. 2 is a control block diagram of the motor drive apparatus according to the first embodiment of the present invention.

As shown in FIG. 2, the motor drive apparatus 2 includes a control circuit 10, a failure detection circuit 40 and an inverter circuit 60 as the ECU 5. The control circuit 10 includes a current command value calculation section 15 and a d-q control section 20. The control circuit 10 is shown as including a current sensor 75, a vehicle travel speed sensor 95 and the like in addition to the rotation angle sensor 85 and the torque sensor 94. The current command value calculation section 15 inputs a steering torque detection value of the torque sensor 94 and a vehicle travel speed detection value of the travel speed sensor 95, and outputs a current command value to the d-q control section 20. The current command value calculation section 15 further inputs a failure detection output of the failure detection circuit 40 to change the current command value when the failure detection output is applied.

The d-q control section 20 is formed of a d-q axis current conversion section 25, a PI control calculation section 30 and a two-phase to three-phase (2-3 phase) conversion section 35. The d-q axis conversion section 25 D-Q-converts phase current detection values Iu, Iv and Iw of the current sensor 75 to a d-axis current and a q-axis current based on a motor electric angle θ, which is detected by the rotation angle sensor 85 and fed back. The d-axis current and the q-axis current are parallel and orthogonal to the direction of magnetic flux, respectively. The d-axis current and the q-axis current outputted by the d-q axis conversion section 25 are fed back to the current command value calculation section 15. The PI control calculation section 30 calculates an output value by proportional-and-integral control based on a difference between the command value and the detection value. The two-phase voltage command value outputted by the PI control calculation section 30 is converted into three-phase voltages of U-phase, V-phase and W-phase by the two-phase to three-phase conversion section 35 and those voltages are outputted to the inverter circuit 60. The electric angle θ detected by the rotation angle sensor 85 is also fed back to the two-phase to three-phase conversion section 35.

AC power generated by the inverter circuit 60 is supplied to coil sets to drive the motor 80. The current sensor 75 detects output currents of the inverter circuit 60 phase by phase. The rotation angle sensor 85 detects the rotation angle from a center position of the steering wheel 91 by detecting the motor electric angle θ.

Figure 3:
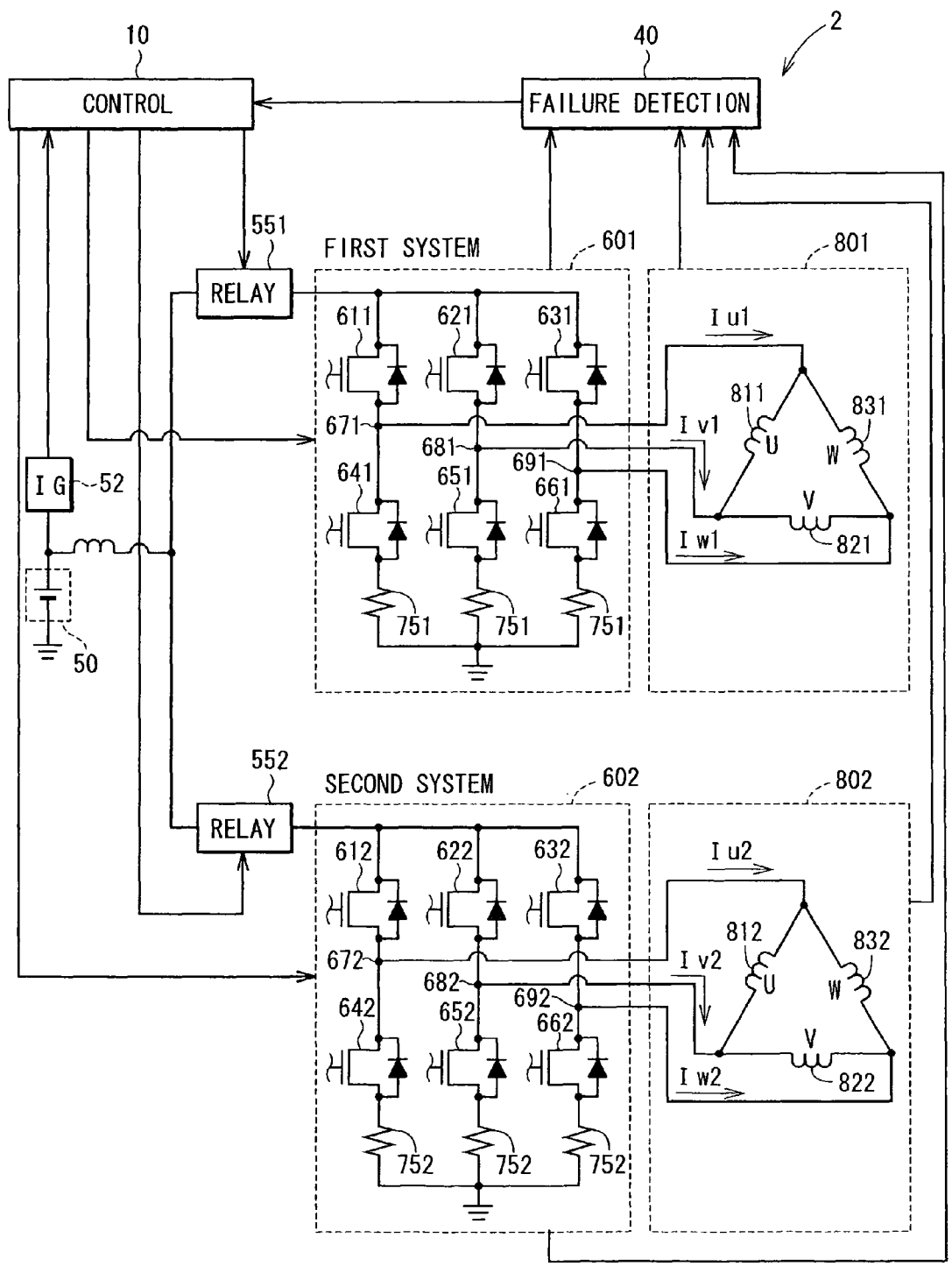
FIG. 3 is a circuit diagram of the motor drive apparatus according to the first embodiment of the present invention.

FIG. 3 shows an exemplary circuit of the motor drive apparatus 2 for two power supply systems. "System" means a pair of one inverter and one coil set (set of coils) corresponding to one inverter. The first system is formed of an inverter 601 and a coil set 801. The second system is formed of an inverter 602 and a coil set 802. The motor drive apparatus 2 may be formed of N systems (N is an integer equal to 3 or more). In such a case, similar systems are added in parallel up to as many as N-th system in FIG. 3.

As shown in FIG. 3, a DC power source 50 of the motor drive apparatus 2 supplies electric power in parallel to the inverter 601 of the first system and the inverter 602 of the second system. Power supply relays 551 and 552 conduct or interrupt power supply from the DC power source 50 to the inverters 601 and 602, respectively. The power supply relays 551 and 552 are a power supply conduction and interruption section.

Since the inverter and the coil set in each of the first system and the second system are the same, the first system is described as an example. Structural elements of the second system correspond to those of the first system. The structural elements in the first system have the last number "1" of reference numerals, and the structural elements of the second system have the last number "2" of reference numerals.

The inverter 601 is a voltage-type PWM inverter, which generates three-phase AC power of U-phase, V-phase and W-phase from DC power. The inverter 601 is formed of a bridge circuit including high-side FETs 611, 621, 631, which are switching elements at the power source voltage side, and low-side FETs 641, 651, 661, which are switching elements at the ground side.

The high-side FETs 611, 621, 631 have drains, which are connected to a power supply line at an output side of the power supply relay 551, and sources, which are connected to drains of the low-side FETs 641, 651, 661. The low-side FETs 641, 651, 661 have sources, which are grounded through shunt resistors 751, respectively. Each of the shunt resistors 751 is a part of the current sensor 75 shown in FIG. 2 and detects phase currents Iu1, Iu2, Iu3 flowing in a U1-coil 811, a V1-coil 821, a W1-coil 831, respectively, which will be described later.

In the U-phase, the source of the high-side FET 611 and the drain of the low-side FET 641 are connected to a U1-terminal 671. The U1-terminal 671 is connected to one end of the U1-coil 811. In the V-phase, the source of the high-side FET 621 and the drain of the low-side FET 651 are connected to a V1-terminal 681. The V1-terminal 681 is connected to one end of the V1-coil 821. In the W-phase, the source of the high-side FET 631 and the drain of the low-side FET 661 are connected to a W1-terminal 691. The W1-terminal 691 is connected to one end of the W1-coil 831.

The motor 80 has magnetic poles on a rotor and the three-phase coils, which are U1-coil 811, V1-coil 821 and W1-coil 831, on a stator. Here, for example, "U1-coil" means a U-phase coil of the first system. The U1-coil 811, the V1-coil 821 and the W1-coil 831 are connected in a Δ-shape to form the coil set 801. The coil set 801 is supplied with the three-phase AC power from the inverter 601 and drives the motor 80 jointly with the coil set 802 of the second system. Thus, the inverter 601 and the coil set 801 are paired in the first system, and the inverter 602 and the coil set 802 are paired in the second system.

The failure detection circuit 40 detects failure of the inverter 601 or the coil set 801 by detecting the phase currents Iu1, Iv1, Iw1, which flow from the phase terminals 671, 672, 673 to the coils 811, 821, 831, respectively, by the shunt resistors 751. The control circuit 10 sets the current command values as target current values, which are to be outputted from the inverter 601 to the coil set 801 based on the signal from the failure detection circuit 40, the rotation angle detection value of the rotation angle sensor 85, the steering torque detection value of the torque sensor 94, the travel speed detection value of the travel speed sensor 95 and the like. An ignition switch 52 is turned on and off by manipulation of a driver on an ignition key. The on/off signal of the ignition switch 52 is inputted to the control circuit 10.

Figure 4:
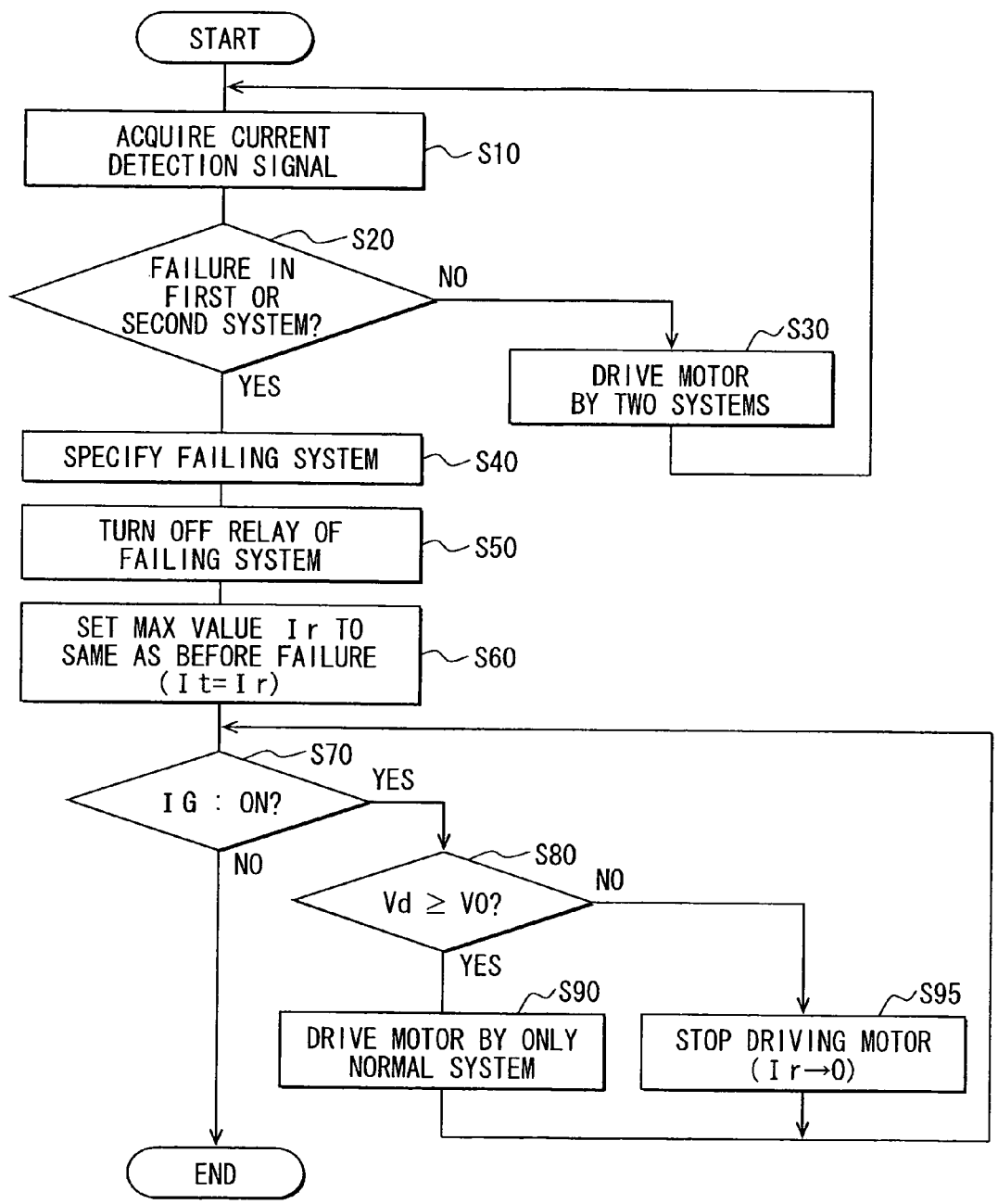
FIG. 4 is a flowchart of failure detection of the motor drive apparatus according to the first embodiment of the present invention.

Operation of the motor drive apparatus 2 at failure detection time will be described next with reference to a flowchart in FIG. 4 and time chart in FIG. 5. In the following description of flowchart, S indicates a step.

While the motor 80 is being driven, the failure detection circuit 40 acquires the current detection signal of the current sensor 75 at S10. The failure detection circuit 40 checks at S20 whether failure of the inverter 601, 602 or the coil 801, 802 has been detected. If NO (no failure) at S20, the control circuit 10 drives the motor 80 by two systems in the same manner as in the normal case at S30. If YES (failure) at S20, the control circuit 10 specifies at S40 a failing system, which is not operating normally.

It is assumed in the following description that the inverter 601 or the coil set 801 of the first system is in failure. At S50, the control circuit 10 interrupts current supply from the DC power source 50 to the inverter 601 by turning off the power supply relay 551 provided in the first system, which is in failure. A current supply limitation value for the inverter 601 becomes 0 after this time.

At next S60, the control circuit 10 sets a current supply limitation value for the inverter 602 of the second system, which is normal, to a maximum current limitation value Ir for only the inverter 602 of the second system. The maximum current limitation value Ir corresponds to the maximum current limitation value, which the inverter 602 of the second system has supplied to the coil set 802 before detection of the failure. Before detection of the failure, the same maximum current limitation value has been provided for the inverter 601 of the first system. That is, the total It of the maximum current limitation values of the two systems is twice as large as the maximum current limitation value Ir of the second system, which is one system. Therefore, by processing of S60, the output of the motor drive apparatus 2 for driving the motor 80 is reduced to one-half, because the maximum current limitation value for the second system is not changed but maintained as before.

It is checked at S70 whether the IG switch 52 is in the ON state. If NO, which indicates that the vehicle is at rest, the operation at the time of failure detection is terminated. If YES at S70, S80 is executed.

At S80, the control circuit 10 checks whether the vehicle travel speed Vd at present is equal to or greater than a threshold value V0. The threshold value V0 is, for example, 4 km/h, which corresponds to about a travel speed attained when the vehicle has started to travel from the stop condition. YES at S80 indicates that the vehicle is traveling normally. In this case, S90 is executed. At S90, the control circuit 10 drives the motor 80 by commanding a current command value to the inverter 602 of the second system, which is the normal system. Thus the driver can perform the steering operation by receiving the steering assist torque, which is about one-half of normal time, from one of the two systems.

NO at S80 indicates that the vehicle is parked, starting to travel or about to stop. In this case, S95 is executed. At S95, the control circuit 10 sets the current supply limitation value Is2 for the second system, which is normal. As a result, the assist torque of the electric power steering system 1 is not generated at all. If the driver operates the steering wheel 91 under this condition, the driver will feel that steering is heavy because no steering assist torque is provided. Thus, the driver is caused to sense changes in the steering torque and surely notice occurrence of failure. The driver is thus motivated to take the vehicle to a repair shop soon. After S90 or S95, S70 is executed to repetitively check whether the ignition switch 52 is ON or OFF.

Figure 5:
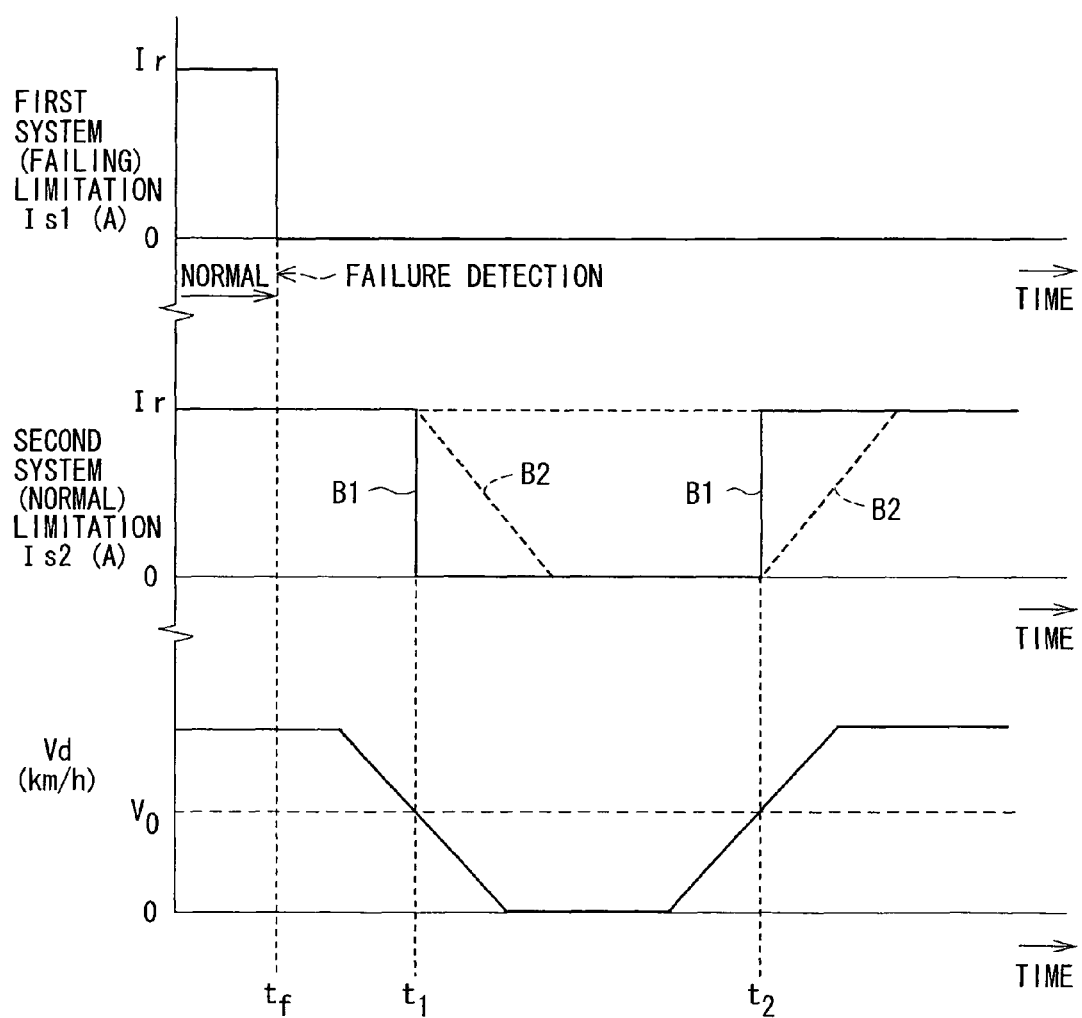
FIG. 5 is a time chart of operations of the motor drive apparatus according to the first embodiment and a second embodiment of the present invention at failure detection time.

Operation of the motor drive apparatus 2 at the time of failure detection is shown in FIG. 5. Here it is assumed that the inverter 601 or the coil set 801 of the first system of the motor drive apparatus 2 fails while the vehicle is traveling. Until the failure is detected at time tf, the current supply limitation values Is1 for the first system and Is2 for the second system are both set to a normal-time maximum current limitation value Ir. The motor 80 is driven by a total output of the first system and the second system.

When the failure detection circuit 40 detects at time tf that the inverter 601 or the coil set 801 of the first system is in failure, the control circuit 10 turns off the power supply relay 551 of the first system and interrupts the current supply from the DC power source 50 to the inverter 601 of the first system. As a result, the current supply limitation value Is1 for the first system becomes zero as shown in (a) of FIG. 5.

Then, as shown in (b) of FIG. 5, the control circuit 10 maintains the current supply limitation value Is2 for the second system, which is normal, at the maximum current limitation value Ir, when the travel speed detection value Vd is equal to or greater than the threshold value V0. The threshold value V0 is set to, for example, 4 km/h, which generally corresponds to a travel speed a vehicle attains immediately after starting from the vehicle stop condition. Therefore, the travel speed Vc is equal to or greater than the threshold value V0 without fail in case of normal travel. Thus, the inverter 602 of the second system drives the motor 80 with the current command value Is2, which is equal to or less than the maximum current limitation value Ir of normal time. The driver is allowed to operate the steering wheel 91 by receiving the steering assist torque generated by one system. This steering assist torque is about one-half of that provided by the two systems at normal time.

When the vehicle decelerates and the travel speed detection value Vd becomes less than the threshold value V0 at time t1 as shown in (c) if FIG. 5, the control circuit 10 sets the current supply limitation value Is2 for the second system to zero. At this time, as shown by a solid line B1 in (b) of FIG. 5, the current supply limitation value Is2 is reduced in step from the maximum current limitation value Ir to zero. As a result, no assist torque is generated at all.

If the vehicle is traveling straight when the failure is detected at time tf, the steering wheel 91 need not be operated and hence no steering torque is generated. The driver will not notice the occurrence of failure. After time t1, however, the driver will feel that the steering is heavy in turning the steering wheel, because no steering assist torque is provided. Thus, the driver is caused to sense changes in the steering torque and surely notice the occurrence of failure so that the driver is motivated to take the vehicle to the repair shop.

When the travel speed detection value Vd becomes equal to or greater than the threshold value V0 at time t2, for acceleration from the vehicle stop condition (Vd=0), the control circuit 10 increases the current supply limitation value Is2 for the second system from zero to the maximum current limitation value Ir stepwisely as shown by the solid line B1 in (b) of FIG. 5. Thus, the steering assist torque is generated again.

(Advantage)

The motor drive apparatus 2 according to the first embodiment provides the following advantages.

(1) When a failure in the inverter 601 or coil set 801 of the first system is detected, the control circuit 10 stops driving the motor 80 so that no steering torque is provided when the travel speed detection value Vd falls below the predetermined threshold value V0. Thus, the driver is caused to sense changes in the steering torque and surely notice the occurrence of failure when the driver turns the steering wheel 91. It is thus avoided that, as a result of driver's continued drive of the vehicle without noticing the occurrence of failure, the second system also fails and the steering torque is not assisted at all.

(2) When the travel speed detection value Vd is less than the threshold value V0, in which the motor drive apparatus 2 will be loaded particularly heavily, driving the motor 80 is stopped. As a result, the inverter 602 of the second system operating normally is protected from being excessively loaded and overheating.

(3) When the travel speed detection value Vd exceeds the predetermined threshold value V0, in which the motor drive apparatus 2 will be loaded relatively lightly, the control circuit 10 sets the predetermined maximum current limitation value Ir as the upper limit value of the current supply limitation value. The inverter 602 can be used with the same or less loading as before the detection of failure by setting the maximum current limitation value Ir to about the same value as the maximum current limitation value provided for the inverter 602 and the coil set 802 of the second system before the detection of failure. It is thus possible to protect the inverter 602 from being excessively loaded and overheating.

(4) When the driver needs to operate the steering wheel 91 in the normal travel time, which is other than the travel stop time or the travel start time, after noticing the occurrence of failure, the driver can drive the vehicle to the repair shop by operating the steering wheel 91 with the steering assist torque, which is about one-half of that of the normal time.

Second Embodiment

A second embodiment is different from the first embodiment only in the control method of varying the current supply limitation value Is2. According to the second embodiment, as shown by a dotted line B2 in (b) of FIG. 5, the current supply limitation value Is2 is reduced gradually from the maximum current limitation value Ir to a predetermined value (for example, zero) and increased gradually from the predetermined value to the maximum current limitation value Ir. That is, the current supply to the motor 80 is changed gradually. For causing the driver to notice failure in the power supply system by changes in the steering torque, a rapid change in the steering torque will be most effective. However, it generates a shock in the steering operation. By gradually changing the current supply limitation value Is2, the driver can be caused to appropriately notice changes in the steering torque without causing shocks in the steering operation.

Other Embodiments (A) In the foregoing embodiments, the case, in which the vehicle travel speed detection value Vd is equal to the threshold value V0, is included in the case, in which the vehicle travel speed detection value Vd is greater than the threshold value V0. It is also practically possible to include the case, in which the vehicle travel speed detection value Vd is equal to the threshold value V0, in the case, in which the vehicle travel speed detection value Vd is less than the threshold value V0.

(B) In the foregoing embodiments, the maximum current value limitation value Ir, which is the upper limitation value of the current supply limitation value, is set to be about the same as the normal-time maximum current limitation value, which has been outputted to the coils by the inverter operating normally before the failure detection. However it is also possible to set a different maximum current limitation value. This maximum current limitation value is preferably set to a value, which will not overload the inverter.

(C) In the foregoing embodiments, the control circuit 10 sets the current limitation value Is2 of the second system to the predetermined value, when the travel speed detection value Vd is less than the threshold value V0. However, the current supply to the inverter 602 may be interrupted by turning off the power supply relay 552 of the second system. In this case, when the travel speed detection value Vd becomes equal to or greater than the threshold value V0 again, the power supply relay 552 is turned on to resume the current supply to the inverter 602.

(D) In the second embodiment, the current supply limitation value Is2 is gradually changed in both increasing direction and decreasing direction. However, it may be gradually changed in only either one of the increasing direction and the decreasing direction.

(E) In the foregoing embodiments, checking ON or OFF of the ignition switch may be eliminated.

(F) It is possible to caution the driver by a notification device such as a warning light or a buzzer in addition to the processing in the foregoing embodiments, when the failure is detected.

The present invention is not limited to the foregoing embodiments and may be implemented in other different embodiments.

What is claimed is:

1. A motor drive apparatus for driving a motor, which includes a plurality of coil sets, the motor drive apparatus comprising:
   a plurality of inverters for converting DC power of a DC power source to AC power, the inverters being paired with the coil sets of the motor;
   a failure detection circuit for detecting failure in the inverters or the coil sets by detecting currents flowing in the inverters or the coil sets;
   a power interruption section capable of interrupting power supply from the DC power source to the inverters;
   a control circuit for setting a current command value of a current outputted from each inverter to a paired coil set and setting a current supply limitation value, which is an upper limitation value of the current command value; and
   a speed sensor for detecting a travel speed of a vehicle driven by a driver,
   wherein, when the failure detection circuit detects the failure in any one of the inverters or the coil sets, the power supply interruption section interrupts power supply to the inverter that corresponds to the inverter or the coil set, which is detected as having failure,
   wherein the control circuit drives the motor by commanding the current command value for the inverter operating normally when a travel speed detection value of the speed detection sensor is greater than a predetermined threshold value,
   wherein the control circuit stops the motor by reducing the current command value for the inverter operating normally to about zero or interrupting supply of current to the inverter operating normally by the power interruption section when the travel speed detection value is less than the predetermined threshold value; wherein
   the control circuit sets the current supply limitation value for the inverter operating normally to a predetermined maximum current limitation value when the failure is detected.

2. The motor drive apparatus according to claim 1, wherein:
   the control circuit gradually decreases the current supply limitation value for the inverter operating normally to zero, when the travel speed detection value falls below the predetermined threshold value.

3. The motor drive apparatus according to claim 1, wherein:
   the control circuit gradually increases the current supply limitation value for the inverter operating normally from zero, when the vehicle speed detection value rises above the predetermined threshold value.

4. An electric power steering apparatus comprising:
   a motor for assisting vehicle steering operation of a driver;
   a power transfer device for transferring rotation of the motor to a steering shaft of the vehicle; and
   the motor drive apparatus according to claim 1.

* * * * *